(12) United States Patent
Su et al.

(10) Patent No.: US 6,958,601 B1
(45) Date of Patent: Oct. 25, 2005

(54) MOTORCYCLE MILEAGE INDUCTOR

(76) Inventors: Kuo-Hsin Su, 3/F., No. 212, Chunghsing Rd., Sec. 3, Hsintien City, Taipei County (TW); Paul Huang, 200 Port Royal Ave., Foster City, CA (US) 94404; Paul Fei-Ta Chen, 1769 Laurentian Wy, Sunnyvale, CA (US) 94087

(*) Notice: Subject to any disclaimer, the term of this patent is extended or adjusted under 35 U.S.C. 154(b) by 0 days.

(21) Appl. No.: 11/052,067

(22) Filed: Feb. 8, 2005

(51) Int. Cl.[7] ................................................. G01B 7/30
(52) U.S. Cl. ........................ 324/207.25; 324/207.2; 73/514.16; 73/514.31
(58) Field of Search ........................... 324/173–174, 324/207.2–207.22, 207.25, 251, 259–261; 73/514.16, 514.31, 514.39, 494

(56) References Cited

U.S. PATENT DOCUMENTS 3,915,266 A * 10/1975 Lantz ................... 188/181 R
5,880,585 A * 3/1999 Oguro .................... 324/174

* cited by examiner

*Primary Examiner*—Bot Ledynh
(74) *Attorney, Agent, or Firm*—Rosenberg, Klein & Lee

(57) ABSTRACT

A motorcycle mileage counter inductor is constructed to include a magnetic device holder mounted in the outer end of the tubular color of the wheel set of a motorcycle's front wheel, an annular magnetic device mounted on the magnetic device holder, the annular magnetic device having a plurality of magnets alternatively abutted against one another in reversed directions, and a sensor formed of a Hall chip and mounted in a cover shell being affixed to the front fork of the motorcycle around the outer end of the tubular collar and electrically connected to the mileage counter and ABS (anti-locking brake system) of the motorcycle through a signal line for detecting the amount of rotation of the motorcycle's front wheel and providing a signal indicative of the amount of rotation of the motorcycle's front wheel to the mileage counter and ABS of the motorcycle.

3 Claims, 6 Drawing Sheets

Tire-Poles Comparision Table (error +1.67%, -1.51% )   Circumference/number of poles mean value = 45.8mm

| Tire Size | Circumference (mm) | Cycles/KM | Tire Circumference /Max Circumference | 48 X circumference | Poles (rounded) | Circumference/Poles | (Cycles/KM) X 45.8 | Reading at 100km/hr |
|---|---|---|---|---|---|---|---|---|
| 3.0-10 | 1276.742 | 783 | 0.584 | 28.052 | 28 | 45.5979349 | 1004119.2 | 100.41192 |
| 100/80-10 | 1300.618 | 768 | 0.595 | 28.576 | 28 | 46.4506521 | 984883.2 | 98.48832 |
| 90/90-10 | 1306.901 | 765 | 0.598 | 28.714 | 29 | 45.0655669 | 1016073 | 101.6073 |
| 120/70-10 | 1325.751 | 754 | 0.607 | 29.129 | 29 | 45.715551 | 1001462.8 | 100.14628 |
| 110/80-10 | 1350.884 | 740 | 0.618 | 29.681 | 30 | 45.0294567 | 1016760 | 101.676 |
| 3.5-10 | 1356.539 | 737 | 0.621 | 29.805 | 30 | 45.2179521 | 1012638 | 101.2638 |
| 130/70-10 | 1369.733 | 730 | 0.627 | 30.095 | 30 | 45.6577747 | 1003020 | 100.302 |
| 120/70-11 | 1405.547 | 711 | 0.643 | 30.882 | 31 | 45.3402376 | 1009477.8 | 100.94778 |
| 120/90-10 | 1476.547 | 677 | 0.676 | 32.442 | 32 | 46.1421031 | 992211.2 | 99.22112 |
| 120/70-12 | 1485.344 | 673 | 0.680 | 32.635 | 32 | 46.4169923 | 986348.8 | 98.63488 |
| 130/70-12 | 1529.326 | 653 | 0.700 | 33.601 | 33 | 46.3432125 | 986944.2 | 98.69442 |
| 130/90-10 | 1533.096 | 652 | 0.702 | 33.684 | 33 | 46.4574521 | 985432.8 | 98.54328 |
| 120/70-13, 140/60-1 | 1565.140 | 638 | 0.716 | 34.388 | 34 | 46.0335335 | 993493.6 | 99.34936 |
| 140/70-12 | 1573.308 | 635 | 0.720 | 34.568 | 34 | 46.2737727 | 988822 | 98.8822 |
| 110/90-12 | 1579.591 | 633 | 0.723 | 34.706 | 35 | 45.1311843 | 1014699 | 101.4699 |
| 110/100-12 | 1648.706 | 606 | 0.755 | 36.224 | 36 | 45.7974009 | 999172.8 | 99.91728 |
| 120/60-17 | 1808.928 | 552 | 0.828 | 39.745 | 40 | 45.2231881 | 1011264 | 101.1264 |
| 110/70-17 | 1840.343 | 543 | 0.842 | 40.435 | 40 | 46.0085856 | 994776 | 99.4776 |
| 130/60-17, 120/65-1 | 1846.627 | 541 | 0.845 | 40.573 | 40 | 46.1656651 | 991112 | 99.1112 |
| 130/70-16 | 1848.512 | 540 | 0.846 | 40.614 | 40 | 46.2127889 | 989280 | 98.928 |
| 100/80-17 | 1859.193 | 537 | 0.851 | 40.849 | 41 | 45.3461698 | 1008378.6 | 100.83786 |
| 120/80-16 | 1879.927 | 531 | 0.861 | 41.305 | 41 | 45.8518892 | 997111.8 | 99.71118 |
| 120/70-17 | 1884.326 | 530 | 0.863 | 41.401 | 41 | 45.959163 | 995234 | 99.5234 |
| 110/90-17 | 1898.777 | 526 | 0.869 | 41.719 | 42 | 45.2089761 | 1011813.6 | 101.18136 |
| 110/80-17 | 1909.458 | 523 | 0.874 | 41.953 | 42 | 45.4632053 | 1006012.8 | 100.60428 |
| 3.00-18 | 1915.113 | 522 | 0.877 | 42.078 | 42 | 45.5979349 | 1004119.2 | 100.41192 |
| 90/90-18 | 1945.273 | 514 | 0.890 | 42.740 | 42 | 46.3160126 | 988730.4 | 98.87304 |
| 3.25-18 | 1955.011 | 511 | 0.895 | 42.954 | 43 | 45.4653827 | 1006363.4 | 100.63634 |
| 120/70-18 | 1964.122 | 509 | 0.899 | 43.154 | 43 | 45.6772574 | 1002424.6 | 100.24246 |
| 110/80-18 | 1989.255 | 502 | 0.911 | 43.707 | 43 | 46.2617393 | 988638.8 | 98.86388 |
| 3.50-18 | 1994.910 | 501 | 0.913 | 43.831 | 44 | 45.3388557 | 1009615.2 | 100.96152 |
| 100/90-18 | 2001.821 | 499 | 0.916 | 43.983 | 44 | 45.4959352 | 1005584.8 | 100.55848 |
| 130/70-18 | 2008.104 | 497 | 0.919 | 44.121 | 44 | 45.6387347 | 1001554.4 | 100.15544 |
| 130/80-17 | 2009.989 | 497 | 0.920 | 44.162 | 44 | 45.6815746 | 1001554.4 | 100.15544 |
| 130/90-16 | 2011.874 | 497 | 0.921 | 44.204 | 44 | 45.7244145 | 1001554.4 | 100.15544 |
| 150/70-17 | 2016.272 | 495 | 0.923 | 44.300 | 44 | 45.8243741 | 997524 | 99.7524 |
| 3.25-19 | 2034.808 | 491 | 0.931 | 44.708 | 44 | 46.2456328 | 989463.2 | 98.94632 |
| 120/90-17 | 2035.122 | 491 | 0.932 | 44.714 | 44 | 46.2527728 | 989463.2 | 98.94632 |
| 120/80-18 | 2039.520 | 490 | 0.934 | 44.811 | 45 | 45.3226717 | 1009890 | 100.989 |
| 110/90-18 | 2058.370 | 485 | 0.942 | 45.225 | 45 | 45.7415504 | 999585 | 99.9585 |
| 140/80-17 | 2060.255 | 485 | 0.943 | 45.267 | 45 | 45.7834383 | 999585 | 99.9585 |
| 110/80-19 | 2069.051 | 483 | 0.947 | 45.460 | 45 | 45.978915 | 995463 | 99.5463 |
| 4.00-18 | 2074.706 | 481 | 0.950 | 45.584 | 45 | 46.1045786 | 991341 | 99.1341 |
| 100/90-19 | 2081.618 | 480 | 0.953 | 45.736 | 45 | 46.2581674 | 989280 | 98.928 |
| 120/90-18 | 2114.918 | 472 | 0.968 | 46.468 | 46 | 45.9764867 | 994409.6 | 99.44096 |
| 80/90-21 | 2128.113 | 469 | 0.974 | 46.758 | 46 | 46.2633275 | 988089.2 | 98.80892 |
| 110/90-19 | 2138.166 | 467 | 0.979 | 46.978 | 47 | 45.4928969 | 1005264.2 | 100.52642 |
| 90/90-21 | 2184.662 | 457 | 1.000 | 48.000 | 48 | 45.5137851 | 1004668.8 | 100.46688 |

FIG. 4

MOTORCYCLE MILEAGE INDUCTOR

BACKGROUND OF THE INVENTION

1. Field of the Invention

The present invention relates to motorcycle mileage counters and, more specifically, to a motorcycle mileage inductor, which accurately detects the amount of rotation of the motorcycle's front wheel.

2. Description of the Related Art

There are two types of motorcycle mileage counters, i.e., the mechanical type and the electronic type. A mechanical type mileage counter uses a gear set for rotating a cable upon rotation of the motorcycle's front wheel, causing the mileage counter to count the number of turns. An electronic mileage counter uses an electronic device as sensor means to detect the amount of rotation of the motorcycle's front wheel and to provide a signal indicative of the amount of rotation of the motorcycle's front wheel to the internal circuit of the electronic mileage counter, which is in turn converts the signal into data for display. Either of mechanical type or electronic type, a motorcycle has installed therein a particular specification gear set or program. When changed the front wheel with a different model, the gear set or program may not fit the specification of the new front wheel perfectly, and a counting error will occur under this situation.

U.S. Pat. No. 5,880,585 shows a rotation detector for two-wheel vehicle. As shown in FIGS. 5 and 6, a plurality of elements 52 are mounted in a hole 51 at a wheel hub 5; a collar 62 is mounted in a housing 6 for the passing of a shaft 622; a magnetic rotor 7 mounted on the outer portion 621 of the collar 62; lugs 71 arranged at the outer end of the magnetic rotor 7 and fit the gaps 521 in between the elements 52; a circuit board 8 is mounted at an insertion portion 61 of the housing 6 and has installed therein a sensor 81. During movement of the two-wheel vehicle, the magnetic rotor 7 is rotated with the hub 5, and the sensor (magnetic conversion element) 81 detects changes in magnetic poles of the magnet, which changes are indicative of rotational displacement by the wheel.

The aforesaid prior art design of rotation detector has numerous drawbacks as follows:

1. The magnetic rotor 7 is directly fastened to the outer portion 621 of the collar 62. During high-speed rotation of the magnetic rotor 7, a friction is produced between the periphery of the hole 72 and the outer portion 621 of the collar 62, and the mechanism will wear quickly with use.

2. Because the magnetic rotor 7 is directly fastened to the outer portion 621 of the collar 62, the gap between the periphery of the hole 72 and the outer portion 621 of the collar 62 must be accurately designed, and the related processing precision is critical.

3. In order to reduce friction between the magnetic rotor 7 and the collar 62, a gap must be left between the hole 72 and the outer portion 621 of the collar 62, however the gap may lower the accuracy of the detection.

4. After matching of the lugs 71 of the magnetic rotor 7 with the gaps 521 in between the elements 52, a clearance will be left between each lug 71 and the two opposite sides of the respective gap 521, such a clearance may cause the magnetic rotor 7 not to be synchronously moved with the wheel, resulting an inaccuracy of the reading of the mileage counter or the action of the ABS (anti-locking braking system) of the two-wheel vehicle.

SUMMARY OF THE INVENTION

The present invention has been accomplished under the circumstances in view. It is one object of the present invention to provide a motorcycle mileage inductor, which uses a magnetic device holder to hold a magnetic device at the collar of the wheel set of the motorcycle's front wheel so that the motorcycle mileage inductor can be conveniently arranged to fit any of a variety of motorcycle wheels. It is another object of the present invention to provide a motorcycle mileage inductor, which is a contact-free design without producing any friction during detection operation. It is still another object of the present invention to provide a motorcycle mileage inductor, which enables the user to change the magnetic device rapidly when changing the tire.

BRIEF DESCRIPTION OF THE DRAWINGS

FIG. 4 is a comparison table of number of magnets (poles) for all commercially available motorcycle tires

DETAILED DESCRIPTION OF THE PREFERRED EMBODIMENT

Figure 1:
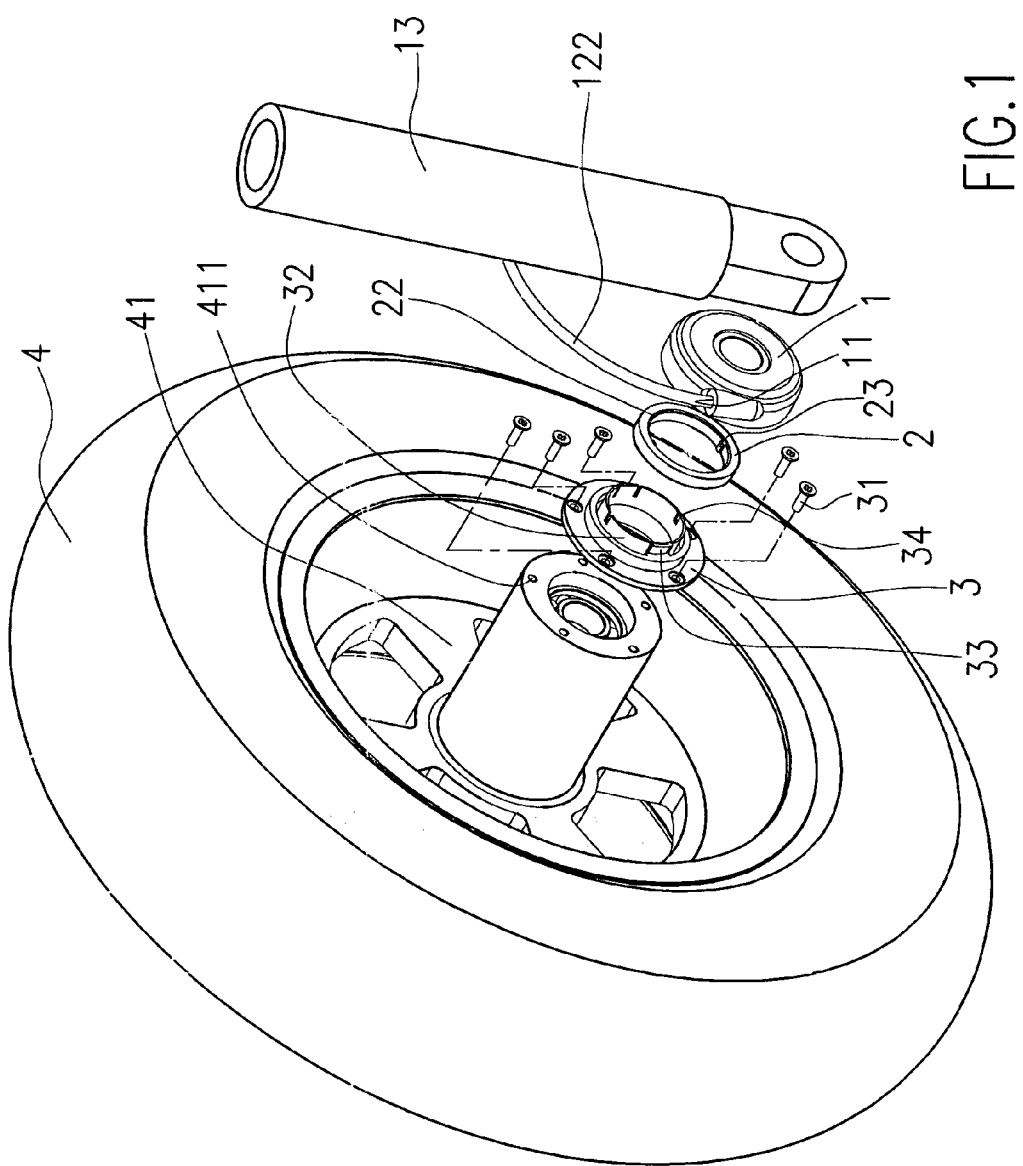
FIG. 1 is an exploded view of the preferred embodiment of the present invention.
Figure 2:
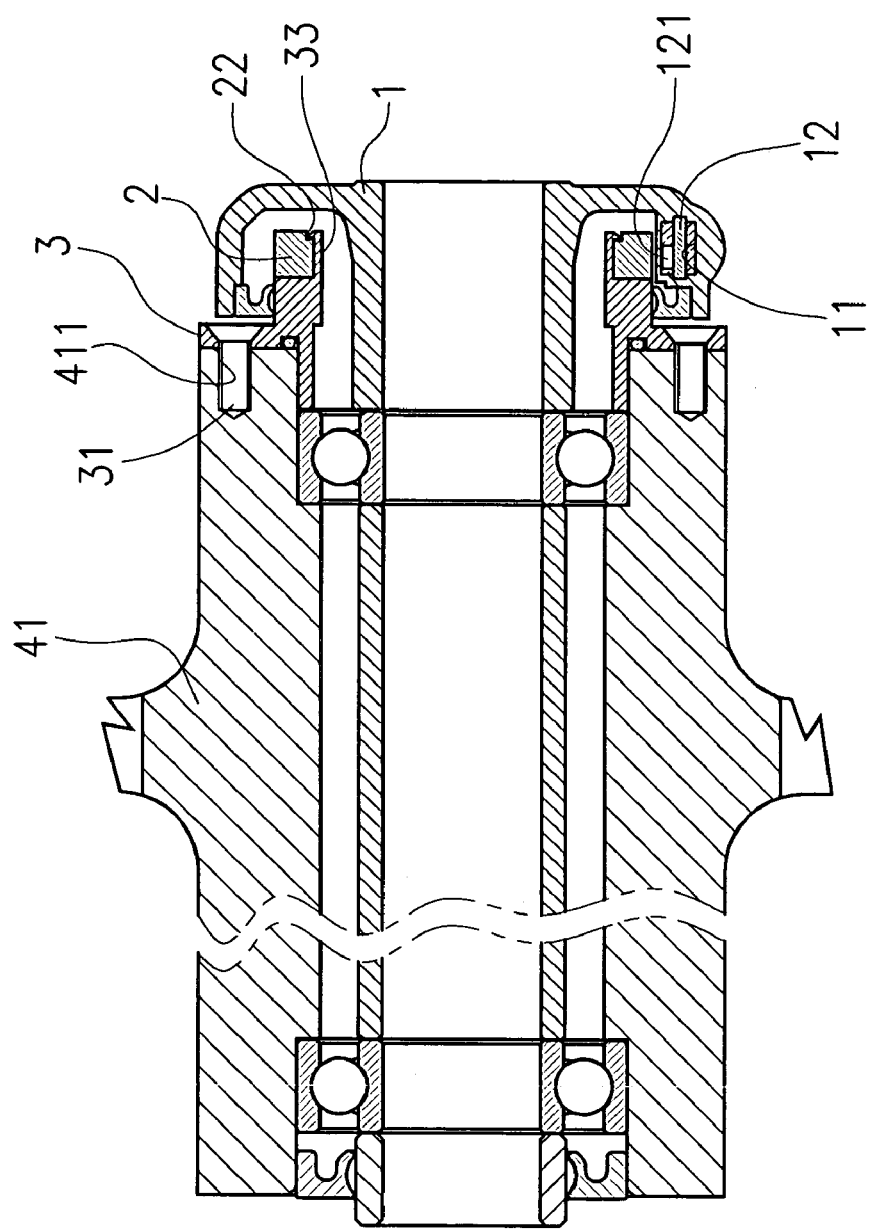
FIG. 2 is a sectional view in an enlarged scale of the preferred embodiment of the present invention.
Figure 3:
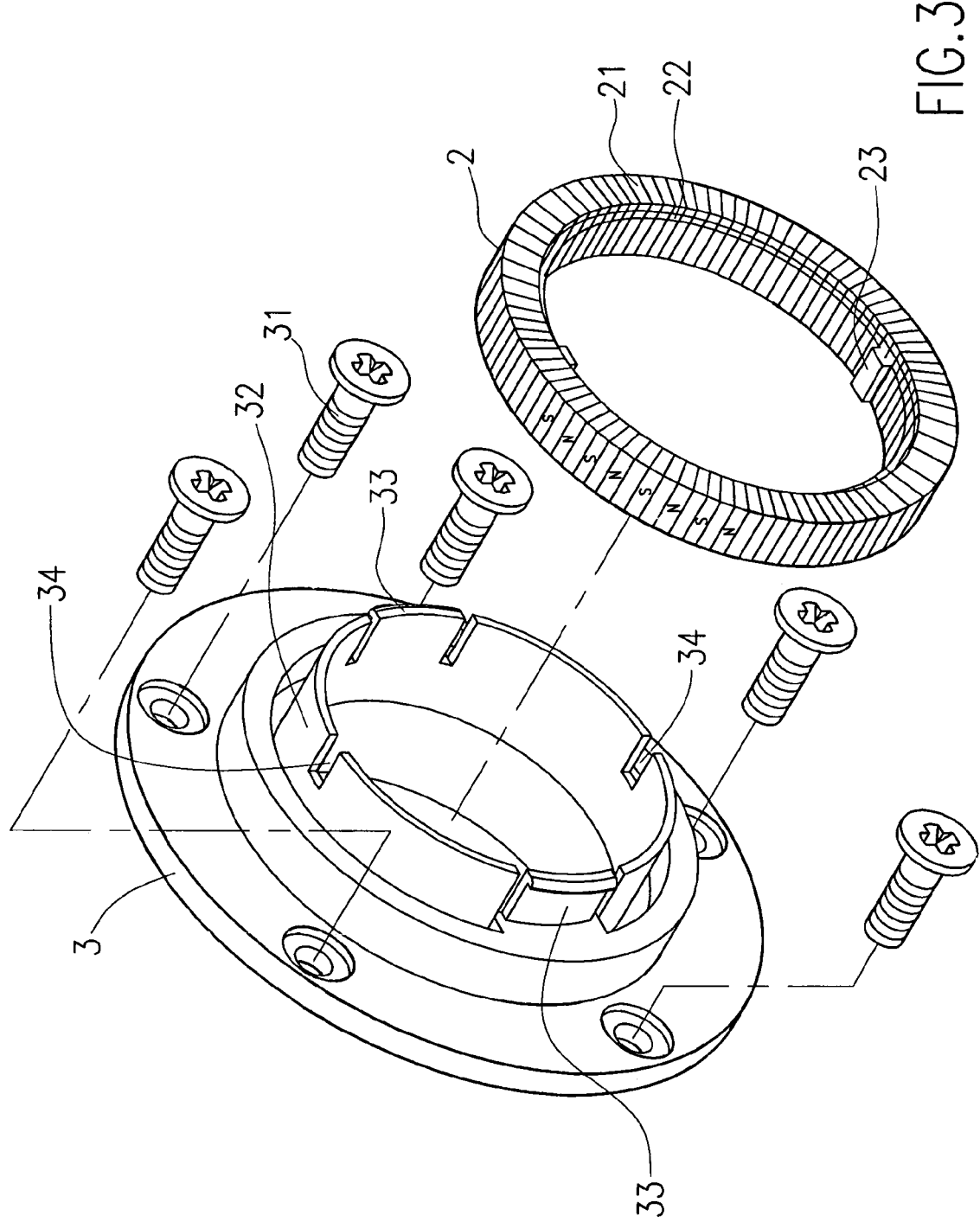
FIG. 3 is an enlarged view of a part of FIG. 1.
Figure 5:
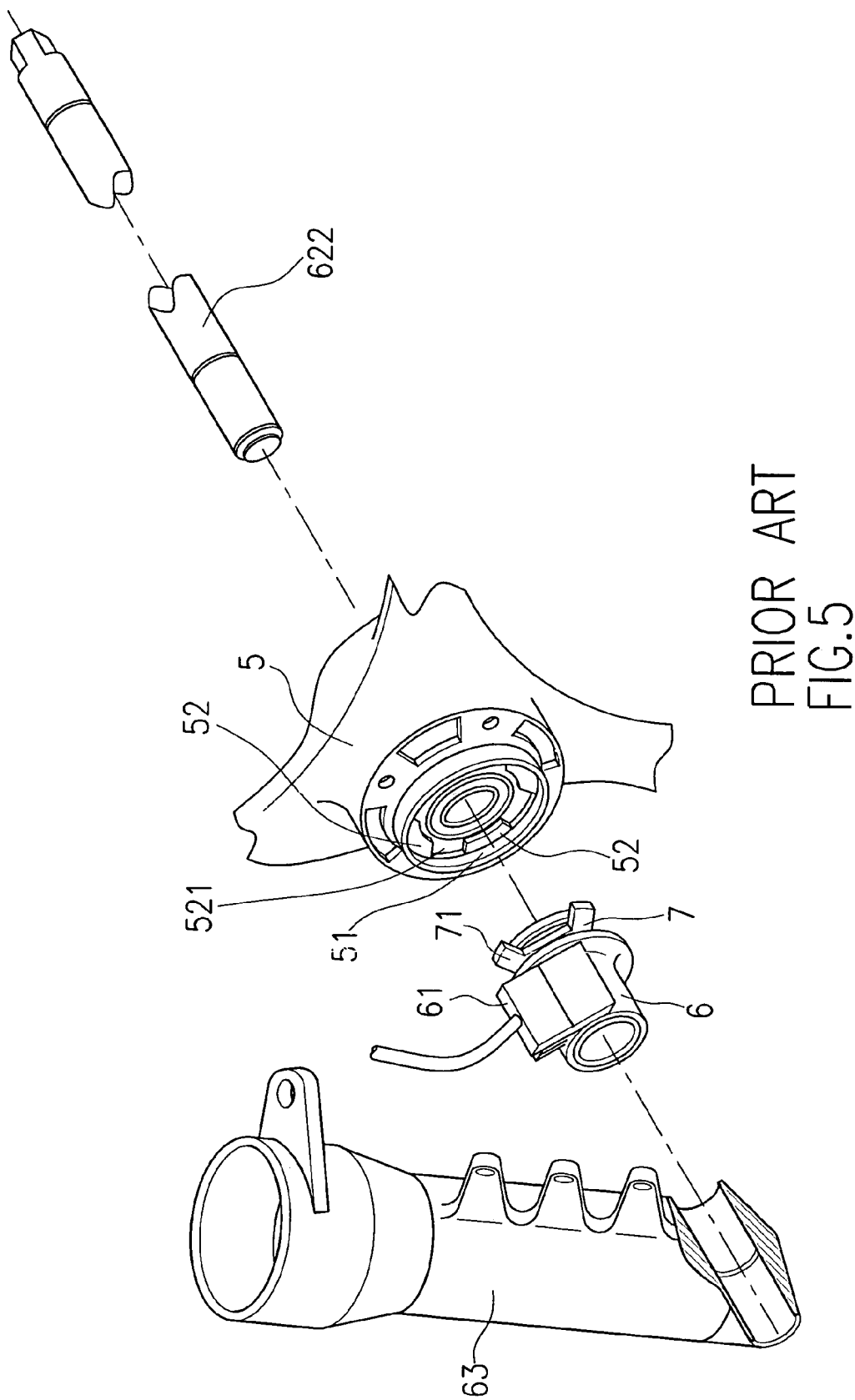
FIG. 5 is an exploded view of the prior art design.
Figure 7:
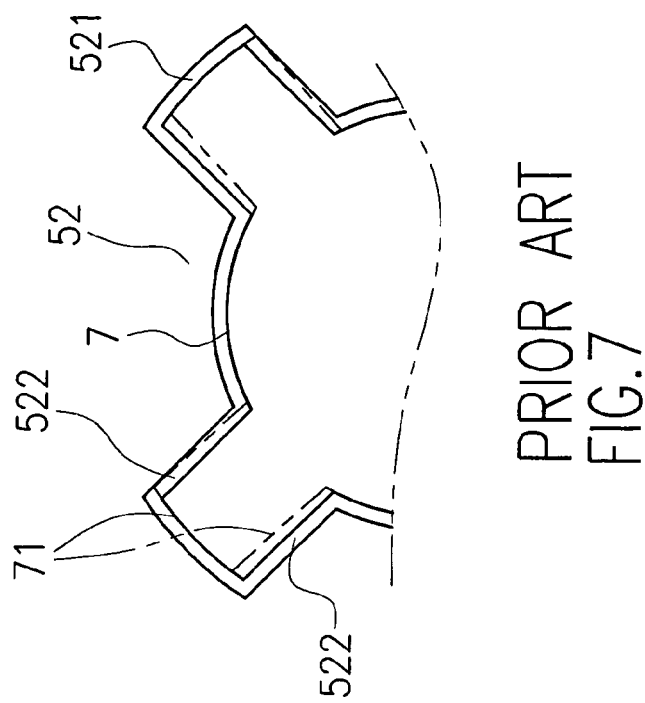
FIG. 7 is an enlarged view of a part of FIG. 5.
Figure 6:
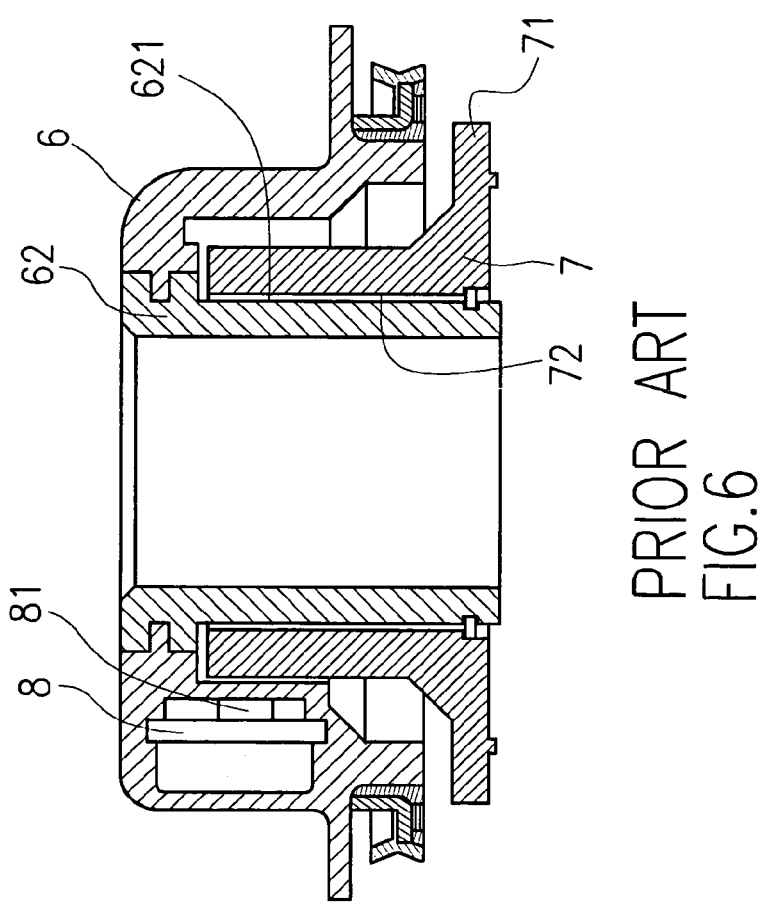
FIG. 6 is a sectional view in an enlarged scale of the prior art design.

Referring to FIGS. 1~3, a motorcycle mileage inductor in accordance with the present invention is shown comprising a magnetic device holder 3, which is fixedly fastened to the screw holes 411 at the outer end of the collar of the wheel set 41 of the front wheel 4 of a motorcycle (not shown) with screws 31, and an annular magnetic device 2 fastened to the magnetic device holder 2. The magnetic device holder 3 is an annular member having a flange 32 perpendicularly forwardly extending around the inner diameter thereof for supporting the annular magnetic device 2. The flange 32 has a plurality of notches 34 and hooked portions 33. The annular magnetic device 2 comprises a plurality of magnets 131 abutted against one another and alternatively arranged in reversed directions, a locating groove 22 extending along the inner diameter and forced into engagement with the hooked portions 33 of the flange 32 of the magnetic device holder 3, and a plurality of inside ribs 23 respectively engaged into the notches 34 for enabling the annular magnetic device 2 to be rotated with the magnetic device holder 3. A cover shell 1 is affixed to the front fork 13 of the motorcycle and covered over the periphery of the outer end of the outer end of the collar of the wheel set 41 of the front wheel 4 without interfering with the rotation of the front wheel 4 upon movement of the motorcycle. The cover shell 1 has a mounting hole 11. A circuit board 12 is mounted in the mounting hole 11 of the cover shell 1, carrying a sensor 121. According to this embodiment, the sensor 121 is formed of a Hall chip, which faces one side of the annular magnetic device 2. When the annular magnetic device 2 is rotating with the magnetic device holder 3 and the front wheel, the sensor 121 detects the amount of rotation of the annular magnetic device 2, and outputs a signal indicative of the amount of rotation of the annular magnetic device 2 (the front wheel of the motorcycle) to the mileage counter of the motorcycle through a signal line 122. By means of the non-friction detection operation of the sensor 121, the rotation data of the front wheel 4 is also provided to the ABS (anti-locking braking system) of the motorcycle, for enabling the ABS of the motorcycle to achieve a precision braking operation.

FIG. 4 is a comparison table of number of magnets (poles) for all commercially available motorcycle tires that are arranged in proper order subject to their circumference ranging from 28 through 48. The one having 48 magnets (poles) is used as the standard (reference value) for precision calculation for other ones. The more the number of magnets (poles) is the higher the value of precision will be. The one having 48 magnets (poles) is used as the standard (reference value) for precision calculation for other ones. The number of magnets (poles) for each motorcycle tire is determined subject to circumference (of one specific motorcycle tire)/ the maximum circumference (of all commercially available motorcycle tires)×48. For example, the number of magnets (poles) for the tire 3.0-10 is calculated as: 1276.7/ 2184.6×48=0.584×48=28.052, and the integral number is 28. The value of circumference/number of magnets (poles) for each model of tire is calculated so as to further obtain the mean value (for example, 45.5979349+ 46.4506521+5.0655669+ . . . +45.5137851)/48=45.8 mm. This mean value is the reference data corresponding to the length each time the sensor detected the presence of one pole. By means of this design, the accurate magnetic device can be selected to achieve an accurate detection.

A prototype of motorcycle mileage inductor has been constructed with the features of the annexed drawings of FIGS. 1~7. The motorcycle mileage inductor functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A motorcycle mileage inductor installed in the tubular collar of the wheel set of the front wheel of a motorcycle and adapted to detect the amount of rotation of the motorcycle front wheel, comprising:

a magnetic device holder fixedly fastened to the tubular collar of the wheel set of said motorcycle's front wheel with screws, said magnetic device holder comprising a flange perpendicularly forwardly extending around an inner diameter thereof, said flange having a plurality of notches and a plurality of hooked portions; and an annular magnetic device mounted said magnet holder magnetic device holder around said flange, said annular magnetic device comprising a plurality of magnets abutted against one another and alternatively arranged in reversed directions, a locating groove extending along an inner diameter and forced into engagement with the hooked portions of said flange of said magnetic device holder, and a plurality of inside ribs respectively engaged into the notches of said flange of said magnetic device holder for enabling said annular magnetic device to be rotated with said magnetic device holder; and a cover shell affixed to the front fork of said motorcycle and covered over the periphery of the outer end of the tubular collar of the wheel set of said motorcycle's front wheel, said cover shell having a mounting hole, a circuit board mounted in said mounting hole of said cover shell, and a sensor installed in said circuit board for acting against the magnets of said annular magnetic device to detect the amount of rotation of said annular magnetic device with said motorcycle's front wheel and to provide a signal indicative of the amount of rotation of said motorcycle's front wheel to the mileage counter and ABS (anti-locking brake system) of said motorcycle.

2. The motorcycle mileage inductor as claimed in claim 1, wherein said sensor is covered with a layer of film for rainwater protection.

3. The motorcycle mileage inductor as claimed in claim 1, wherein said sensor is a Hall chip.

* * * * *